United States Patent
Oh et al.

(10) Patent No.: US 9,740,073 B2
(45) Date of Patent: *Aug. 22, 2017

(54) COMPLEX DISPLAY DEVICE

(71) Applicant: ELECTRONICS AND TELECOMMUNICATIONS RESEARCH INSTITUTE, Daejeon (KR)

(72) Inventors: Ji-Young Oh, Daejeon (KR); Jae Bon Koo, Daejeon (KR); Joo Yeon Kim, Daejeon (KR); Bock Soon Na, Daejeon (KR); Chan Woo Park, Daejeon (KR); Sang Seok Lee, Sejong (KR); Soon-Won Jung, Daejeon (KR); Hye Yong Chu, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/007,912

(22) Filed: Jan. 27, 2016

(65) Prior Publication Data
US 2016/0266459 A1  Sep. 15, 2016

(30) Foreign Application Priority Data
Mar. 10, 2015 (KR) .................. 10-2015-0033292

(51) Int. Cl.
*G02F 1/153* (2006.01)
*G02F 1/15* (2006.01)
(Continued)

(52) U.S. Cl.
CPC .............. *G02F 1/155* (2013.01); *G02F 1/153* (2013.01); *G02F 1/157* (2013.01); *G09G 3/38* (2013.01);
(Continued)

(58) Field of Classification Search
CPC .......... G02F 1/15; G02F 1/1533; G02F 1/155; G02F 1/157; G02F 1/163;
(Continued)

(56) References Cited

U.S. PATENT DOCUMENTS

| 5,859,723 A * | 1/1999 | Jodicke ................. G02F 1/1525 359/270 |
| 6,447,879 B1 * | 9/2002 | Sakurai .................... G02F 1/15 136/255 |

(Continued)

FOREIGN PATENT DOCUMENTS

KR    10-2014-0009727 A    1/2014

OTHER PUBLICATIONS

Kazuki Nakamura, et al., "Electrochemically-switchable emission and absorption by using luminescent Lanthanide(III) complex and electrochromic molecule toward novel display device with dual emissive and reflective mode", Display, vol. 34, pp. 389-395, Aug. 27, 2013.

*Primary Examiner* — Loha Ben
(74) *Attorney, Agent, or Firm* — Rabin & Berdo, P.C.

(57) ABSTRACT

Provided is a complex display device Including a first substrate and an opposed second substrate, a first electrode, an electrochromic layer, a common electrode, an emission part and a second electrode, laminated between the first substrate and the second substrate one by one, and an organic layer disposed between the first electrode and the electrochromic layer, or between the electrochromic layer and the common electrode. The organic layer of the complex (Continued)

display device may include at least one of a hole injection material, a hole transport material and a mixture thereof, or at least one of an electron injection material, an electron transport material or a mixture thereof.

20 Claims, 3 Drawing Sheets

(51) Int. Cl.
  *G09G 3/38* (2006.01)
  *G02F 1/155* (2006.01)
  *G02F 1/157* (2006.01)

(52) U.S. Cl.
  CPC ........ *G02F 1/15* (2013.01); *G02F 2001/1552* (2013.01); *G02F 2001/1555* (2013.01); *G02F 2201/44* (2013.01)

(58) Field of Classification Search
  CPC ..... G02F 2001/1502; G02F 2001/1552; G02F 2001/1555; G02F 2201/12; G02F 2201/121; G02F 2201/44; H01L 27/3232; H01L 27/3244; H01L 51/0037; H01L 51/0077; H01L 51/0078; H01L 51/5203; H01L 51/5281; G09G 3/3208; G09G 3/38
  USPC .... 359/245, 265, 267, 273–275; 345/77, 84, 345/105, 204, 205
  See application file for complete search history.

(56) References Cited

U.S. PATENT DOCUMENTS

| | | | | |
|---|---|---|---|---|
| 7,075,227 | B2* | 7/2006 | Chang | H01L 51/5281 313/504 |
| 7,463,399 | B2* | 12/2008 | Shin | H01L 27/3232 257/59 |
| 7,649,669 | B2* | 1/2010 | Abe | G02F 1/133514 359/242 |
| 8,120,245 | B2* | 2/2012 | Reynolds | G02F 1/155 257/296 |
| 8,284,242 | B2* | 10/2012 | Wang | H04N 13/0409 348/46 |
| 8,702,005 | B2* | 4/2014 | Peters | G02B 5/18 235/492 |
| 8,970,798 | B2* | 3/2015 | Ahn | G02F 1/133512 313/504 |
| 8,976,437 | B2* | 3/2015 | Zhou | G02F 1/167 349/106 |
| 9,477,130 | B2* | 10/2016 | Dubrenat | G02F 1/155 |
| 2012/0091923 | A1* | 4/2012 | Kastner-Jung | B60Q 3/30 315/360 |
| 2014/0014915 | A1 | 1/2014 | Koo et al. | |
| 2014/0042475 | A1 | 2/2014 | Park et al. | |
| 2014/0158997 | A1 | 6/2014 | Ahn et al. | |
| 2015/0077316 | A1* | 3/2015 | Sato | G09G 3/3208 345/77 |
| 2015/0123094 | A1* | 5/2015 | Kang | H01L 51/4246 257/40 |
| 2016/0246151 | A1* | 8/2016 | Oh | G02F 1/155 |

* cited by examiner

COMPLEX DISPLAY DEVICE

CROSS-REFERENCE TO RELATED APPLICATIONS

This U.S. non-provisional patent application claims priority under 35 U.S.C. §119 of Korean Patent Application No. 10-2015-0033292, filed on Mar. 10, 2015, the entire contents of which are hereby incorporated by reference.

BACKGROUND

The present disclosure herein relates to a complex display device, and more particularly, to a complex display device achieving a reflection mode and a self-luminescence mode.

Displays are image display apparatuses providing various sources on information via a screen. Recently, the displays are used in various products such as home appliances and portable electronic equipments. Displays applied in the portable electronic equipments may be classified as a reflection mode display such as an electrophoretic display (EPD), and a self-luminescence mode display such as an organic light emitting diode (OLED).

The self-luminescence mode display has a self-luminescent property on the application of a certain voltage, and so, the responsibility to mobile images and visibility thereof in a dark place may be good, however the energy-saving effect and visibility thereof in the sunlight may be insufficient. Since the reflection mode display reproduces images via the reflection, transmission, or coloring of external light, good properties may be obtained under external conditions such as the sunlight. The displays applied to portable electronic equipments require good image reproducing properties irrespective of external light, and are required to have both properties of the luminescence mode display and the reflection mode display.

SUMMARY

The present disclosure provides a complex display device having good processability and improved driving property by low power.

The tasks to be solved in present disclosure are not limited to the above-mentioned tasks, and other unmentioned tasks will be clearly understood by a person skilled in the art from the following description.

An embodiment of the inventive concept provides a complex display device including a first substrate and an opposed second substrate, a first electrode, an electrochromic layer, a common electrode, an emission part and a second electrode, laminated between the first substrate and the second substrate one by one, and an organic layer disposed between the first electrode and the electrochromic layer, or between the electrochromic layer and the common electrode.

In some embodiments, the organic layer may include at least one of a hole injection material, a hole transport material, or a mixture thereof, or at least one of an electron injection material, an electron transport material, or a mixture thereof. The electron injection material may include PEIE or ZnO. The electron transport material may include $Alq_3$, TPBi, BBOT, PBD, BMD, $Ir(piq)_3$, $Ir(piq)_2(acac)$, or rubrene. The hole injection material may include PEDOT:PSS, PVK, TFB, α-NPD, or TPD. The hole transport material may include 2-TNATA, m-MTDATA, $Ir(piq)_3$, $Ir(piq)_2(acac)$, or rubrene. The complex display device may further include a driving part disposed at least one position between the first substrate and the first electrode, or between the second electrode and the second substrate. The driving part may be disposed between the first substrate and the first electrode, and images produced at the electrochromic layer or the emission part may be displayed via the second substrate. The complex display device may further include a first contact electrically connecting the common electrode and the driving part, and a second contact electrically connecting the second electrode and the driving part. The driving part may be disposed between the second substrate and the second electrode, and images produced at the electrochromic layer or the emission part may be displayed via the first substrate. The complex display device may further include a first contact electrically connecting the common electrode and the driving part, and a second contact electrically connecting the first electrode and the driving part. The emission part may include an organic emission layer.

In an embodiment of the inventive concept, a complex display device includes a first substrate, a first electrode and a second electrode separately disposed in parallel to each other on the first substrate, an electrochromic layer on the first electrode, an emission part on the second electrode, a common electrode disposed on the emission part, extended on the electrochromic layer, a second substrate on the common electrode, and an organic layer disposed at least one position between the first electrode and the electrochromic layer, or between the electrochromic layer and the common electrode.

In some embodiments, the organic layer may include at least one of a hole injection material, a hole transport material, or a mixture thereof, or at least one of an electron injection material, an electron transport material, or a mixture thereof. The electron injection material may include PEIE or ZnO. The electron transport material may include $Alq_3$, TPBi, BBOT, PBD, BMD, $Ir(piq)_3$, $Ir(piq)_2(acac)$, or rubrene. The hole injection material may include PEDOT:PSS, PVK, TFB, α-NPD, or TPD. The hole transport material may include 2-TNATA, m-MTDATA, $Ir(piq)_3$, $Ir(piq)_2(acac)$, or rubrene. The complex display device may further include a driving part disposed between the first substrate and the first electrode. The emission part may include an organic emission layer.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

For sufficient understanding of the features and effects of the present disclosure, exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. One of ordinary skill in the art will understand appropriate circumstances in which the concept of the present disclosure may be conducted. Like reference numerals refer to like elements throughout.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "comprises" and/or "comprising", when used in this specification, specify the presence of stated components, steps, operations and/or elements, but do not preclude the presence or addition of one or more other components, steps, operations and/or elements.

It will also be understood that when a layer (or film) is referred to as being 'on' another layer (or film) or substrate, it can be directly on the other layer (or film) or substrate, or intervening layers (or films) may also be present.

It will be understood that, although the terms first, second, third etc. may be used herein to describe various regions, layers (or films), etc. these regions and layers should not be limited by these terms. These terms are only used to distinguish one region or layer (or film) from another region or layer (film). Thus, a first layer discussed below could be termed a second layer. Example embodiments embodied and described herein may include complementary example embodiments thereof. Like reference numerals refer to like elements throughout.

In addition, example embodiments are described herein with reference to cross-sectional views and/or plan views that are schematic illustrations of idealized example embodiments. In the drawings, the thicknesses of layers and regions may be exaggerated for effective explanation of technical contents. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, a region illustrated as a rectangle will, typically, have rounded or curved features. Thus, the regions illustrated in the figures are schematic in nature and their shapes are not intended to illustrate the actual shape of a region of a device and are not intended to limit the scope of the present inventive concept.

Unless otherwise defined, all terms used herein have the same meaning as commonly understood by one of ordinary skill in the art to which this inventive concept belongs.

Hereinafter, embodiments of the inventive concept will be explained in detail with reference to the accompanying drawings.

The inventive concept relates to a complex display device. More preferably, the complex display device according to exemplary embodiments of the inventive concept may include a reflection mode and a self-luminescence mode, but not include an electrolyte layer or an ion conducting layer in a chromic layer.

Figure 1:
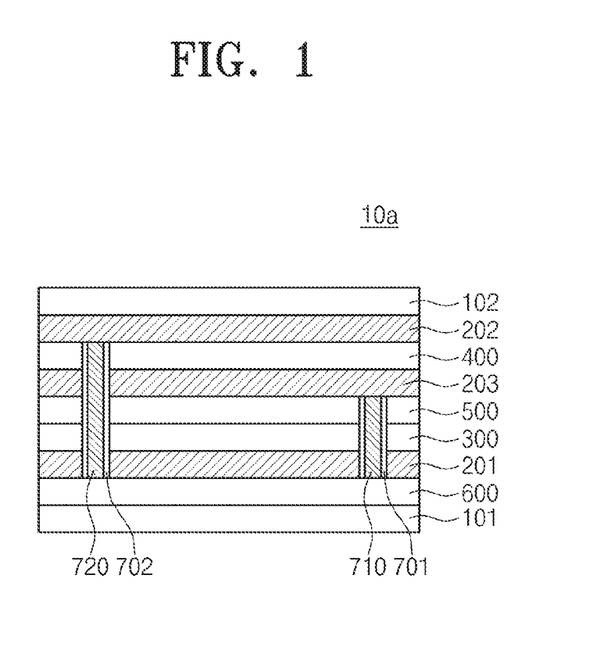
FIGS. 1 and 2 are cross-sectional views of complex display devices according to a first embodiment of the inventive concept.
Figure 2:
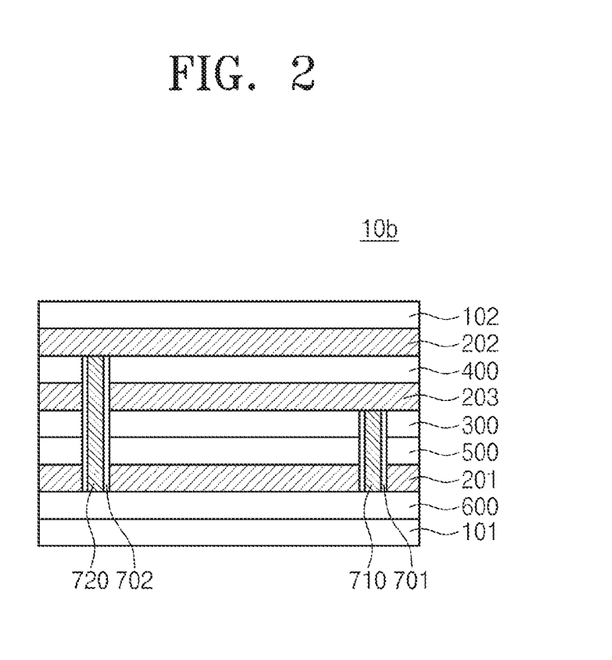

FIGS. 1 and 2 are cross-sectional views of complex display devices according to a first embodiment of the inventive concept.

Referring to FIGS. 1 and 2, complex display devices 10a and 10b according to a first embodiment of the inventive concept may include a first substrate 101, an opposing second substrate 102, a plurality of electrodes provided between the first and second substrates 101 and 102, an electrochromic layer 300, an emission part 400, an organic layer 500 and a driving part 600. The plurality of electrodes may include a first electrode 201, a second electrode 202 and a common electrode 203. The complex display device 10a and the complex display device 10b may be substantially the same except for the position of the organic layer 500. This will be explained in detail below.

The first substrate 101 and the second substrate 102 may be transparent substrates. According to an embodiment, the first and second substrates 101 and 102 may also be substrates of a flexible material. For example, the first and second substrates 101 and 102 may include polyethylene terephthalate (PET), polycarbonate (PC), or polyethylene naphthalate (PEN). According to another embodiment, the first substrate 101 may be a substrate of the above-described flexible material, and the second substrate 102 may be a passivation layer. For example, the second substrate 102 may include silicon oxide, silicon nitride or aluminum oxide.

The first electrode 201 may be disposed on one surface of the first substrate 101 opposed to the second substrate 102. The second electrode 202 may be disposed on one surface of the second substrate 102 opposed to the first substrate 101. The common electrode 203 may be disposed between the first electrode 201 and the second electrode 202. According to an embodiment, the first electrode 201 and the second electrode 202 may be cathodes applying negative voltages to the electrochromic layer 300 and the emission part 400, respectively. In this case, the common electrode 203 may be a common anode applying a positive voltage to the first electrode 201 and the second electrode 202. According to another embodiment, the first electrode 201 and the second electrode 202 may be anodes applying positive voltages to the electrochromic layer 300 and the emission part 400, respectively. In this case, the common electrode 203 may be a common cathode applying a negative voltage to the first electrode 201 and the second electrode 202. The first electrode 201, the second electrode 202 and the common electrode 203 may include a transparent and conductive material. For example, each of the first electrode 201, the second electrode 202 and the common electrode 203 may include Al, TiN, ITO, IZO, or graphene.

The electrochromic layer 300 may be disposed between the first electrode 201 and the common electrode 203. The electrochromic layer 300 may have a thickness from about 2 to about 1,000 nm. When a voltage is applied between the first electrode 201 and the second electrode 203, an oxidation or a reduction reaction may occur in the electrochromic layer 300. Due to the oxidation or the reduction reaction, the optical characteristic of the electrochromic layer 300 may be reversibly changed. The voltage between the common electrode 203 and the first electrode 201 may be switched by the driving part 600. Images produced by the electrochromic layer 300 may be displayed via the second substrate 102. That is, the electrochromic layer 300 may achieve the reflection mode of the complex display devices 10a and 10b. The complex display devices 10a and 10b may effectively exhibit reflection mode images in a bright place. The electrochromic layer 300 may be an electro chromic (EC) device. For example, the electrochromic layer 300 may include $WO_3$ or PEDOT.

According to an embodiment, as shown in FIG. 1, the organic layer 500 may be disposed between the electrochromic layer 300 and the common electrode 203. The organic layer 500 may have a thickness from about 2 to about 1,000 nm. In this embodiment, a material forming the organic layer 500 may be selected according to the polarity of the common electrode 203. Particularly, in the case where the common electrode 203 is an anode, the organic layer 500 may include at least one of a hole injection material, a hole transport material or a mixture thereof. For example, the organic layer 500 may have a structure of a hole injection layer including a hole injection material, a hole transport layer including a hole transport material, or a laminated structure thereof. Alternatively, the organic layer 500 may have a single layer structure including a mixture of a hole injection material and a hole transport material. Differently, in the case where the common electrode 203 is a cathode, the organic layer 500 may include at least one of an electron injection material, an electron transport material or a mixture thereof. In an embodiment, the organic layer 500 may have a structure of an electron injection layer including an electron injection material, an electron transport layer including an electron transport material, or a laminated structure thereof. Alternatively, the organic layer 500 may have a single layer structure including a mixture of an electron injection material and an electron transport material.

The hole injection material may include, for example, at least one of PEDOT:PPS, PVK, TFB, α-NPD or TPD. The hole transport material may include, for example, at least one of 2-TNATA, m-MTDATA, Ir(piq)$_3$, Ir(piq)$_2$(acac) or rubrene. The electron injection material may include, for example, at least one of PEIE or ZnO. The electron transport material may include, for example, at least one of Alq$_3$, TPBi, BBOT, PBD, BMD, Ir(piq)$_3$, Ir(piq)$_2$(acac) or rubrene.

When a voltage is applied between the first electrode 201 and the common electrode 203, charges on common electrode 203 (for example, holes when the common electrode 203 is an anode, or electrons when the common electrode 203 is a cathode) may pass via the organic layer 500 and transfer to the electrochromic layer 300. In this case, the energy level of the organic layer 500 may be an intermediate value of the common electrode 203 and the electrochromic layer 300. With the organic layer 500, charges may be effectively transferred from the common electrode 203 to the electrochromic layer 300. Due to the effective charge transfer via the organic layer 500, the electrochromic layer 300 may have a short response time with respect to an applied voltage.

According to another embodiment, as shown in FIG. 2, the organic layer 500 may be disposed between the first electrode 201 and the electrochromic layer 300. In this embodiment, a material forming the organic layer 500 may be selected according to the polarity of the first electrode 201. In the case where the first electrode 201 is a cathode, the organic layer 500 may include at least one of an electron injection material, an electron transport material and a mixture thereof. For example, the organic layer 500 may have a structure of an electron injection layer including an electron injection material, an electron transport layer including an electron transport material, or a laminated structure thereof. Alternatively, the organic layer 500 may have a single layer structure including a mixture of an electron injection material and an electron transport material. Differently, in the case where the first electrode 201 is an anode, the organic layer 500 may include at least one of a hole injection material, a hole transport material or a mixture thereof. In an embodiment, the organic layer 500 may have a structure of a hole injection layer including a hole injection material, a hole transport layer including a hole transport material, or a laminated structure thereof. Alternatively, the organic layer 500 may have a single layer structure including a mixture of the hole injection material and the hole transport material.

When a voltage is applied between the first electrode 201 and the common electrode 203, charges on common electrode 203 (for example, holes when the first electrode 201 is an anode, or electrons when the first electrode 201 is a cathode) may pass via the organic layer 500 and transfer to the electrochromic layer 300. In this case, the energy level of the organic layer 500 may be an intermediate value of the first electrode 201 and the electrochromic layer 300. With the organic layer 500, charges may be effectively transferred from the first electrode 201 to the electrochromic layer 300. Due to the effective charge transfer via the organic layer 500, the electrochromic layer 300 may have a short response time with respect to an applied voltage.

The emission part 400 may be disposed between the common electrode 203 and the second electrode 202. When a voltage is applied between the common electrode 203 and the second electrode 202, the emission part 400 may be self-luminescent. The voltage between the common electrode 203 and the second electrode 202 may be switched by the driving part 600. Images produced by the emission part 400 may be displayed via the second substrate 102. That is, the emission part 400 may achieve the self-luminescence mode of the complex display devices 10a and 10b. The complex display devices 10a and 10b may effectively exhibit self-luminescence mode images in a dark indoor room.

The emission part 400, the common electrode 203 and the second electrode 202 may be driven as an OLED. For example, the emission part 400 may include a hole injection layer, a hole transport layer, an emission layer, an electron transport layer and an electron injection layer. In the case where the common electrode 203 is a cathode, and the second electrode 202 is an anode, the emission part 400 may include an electron injection layer, an electron transport layer, an emission layer, a hole transport layer and a hole injection layer laminated one by one on the common electrode 203. In the case where the common electrode 203 is an anode, and the second electrode 202 is a cathode, the emission part 400 may include a hole injection layer, a hole transport layer, an emission layer, an electron transport layer and an electron injection layer laminated one by one on the common electrode 203. The hole injection layer, the hole transport layer, the electron injection layer and the electron transport layer of the emission part 400 may respectively include the same material as that of the hole injection layer, the hole transport layer, the electron injection layer and the electron transport layer of the above-described organic layer 500. For example, the hole injection layer of the emission part 400 may include at least one of PEDOT:PPS, PVK, TFB, α-NPD or TPD. The hole transport layer of the emission part 400 may include at least one of 2-TNATA, m-MTDATA, Ir(piq)$_3$, Ir(piq)$_2$(acac) or rubrene. The electron injection layer of the emission part 400 may include at least one of PEIE or ZnO. The electron transport layer of the emission part 400 may include at least one of Alq$_3$, TPBi, BBOT, PBD, BMD, Ir(piq)$_3$, Ir(piq)$_2$(acac) or rubrene.

The driving part 600 may be disposed between the first substrate 101 and the first electrode 201. The driving part 600 may include a plurality of thin film transistors (not shown). The driving part 600 may make an electrical connection with the first electrode 201. Further, the driving part 600 may make electrical connection with the common electrode 203 and the second electrode 202, respectively via a first contact 710 and a second contact 720. For example, a portion of the thin film transistors of the driving part 600 may make an electrical connection with the common electrode 203 via the first contact 710. The first contact 710 may be formed in a first contact hole 701 penetrating the organic layer 500, the electrochromic layer 300 and the first electrode 201 and exposing the driving part 600. The first contact may be insulated from the organic layer 500, the electrochromic layer 300 and the first electrode 201. For example, the first contact 710 may be spaced apart from the outer wall of the first contact hole 701. For example, an insulating material may be disposed between the first contact 710 and the outer wall of the first contact hole 701. Another portion of the thin film transistors of the driving part 600 may make electrical connection with the second electrode 202 via the second contact 720. The second contact 720 may be formed in a second contact hole 702 penetrating the emission part 400, the common electrode 203, the organic layer 500, the electrochromic layer 300 and the first electrode 201 and exposing the driving part 600. The second contact 720 may be insulated from the emission part 400, the common electrode 203, the organic layer 500, the electrochromic layer 300 and the first electrode 201. For example, the second contact 720 may be spaced apart from the outer wall of the second contact hole 702. For example, an insulating material may be disposed between the second contact 720 and the outer wall of the second contact hole 702. Accordingly, the driving part 600 may control the achievement of the reflection mode and the self-luminescence mode of the complex display devices 10*a* and 10*b*. For example, the driving part 600 may achieve the self-luminescence mode by applying a voltage between the common electrode 203 and the second electrode 202. For example, the driving part 600 may achieve a reflection mode by applying a voltage between the first electrode 201 and the common electrode 203. By selectively driving the reflection mode or the self-luminescence mode by the driving part 600, the complex display devices 10*a* and 10*b* may achieve a dual mode (that is, the reflection mode and the self-luminescence mode) to suit its environment.

According to exemplary embodiments, an organic layer other than an electrolyte (or an ion conducting layer) may be used as a charge mediation layer for an electrochromic layer. Therefore, partitions or an encapsulating process for storing an electrolyte is/are not required, and the deterioration of stability due to the volatilization of solvents may not be generated. Accordingly, a complex display device having good structural stability and visibility, and of which manufacturing process is simple, may be provided. Further, since the complex display device according to an embodiment uses only one driving part, power consumption may decrease, and power efficiency may increase.

Hereinafter, a method of manufacturing the complex display device 10*a* according to an embodiment will be explained.

Referring to FIG. 1, a driving part 600 including a plurality of thin film transistors (not shown) may be formed on a first substrate 101. The plurality of thin film transistors (not shown) may be formed through a plurality of unit processes such as a deposition process, a photolithography process and an etching process.

On the driving part 600, a first electrode 201 may be formed. In an embodiment, the first electrode 201 may be formed by forming a transparent conductive layer on the driving part 600 and then patterning thereof. For example, the transparent conductive layer may be deposited by a sputtering method.

On the first electrode 201, an electrochromic layer 300 may be formed. The electrochromic layer 300 may be deposited by a vacuum deposition or a solution-based deposition method. For example, the electrochromic layer 300 may be deposited by a deposition method in vacuum including a vacuum deposition polymerization method, a sputtering method, a vacuum deposition method, a vacuum thermal deposition method or an electron beam deposition method. For example, the electrochromic layer 300 may be deposited by the solution-based deposition method including a spin coating, a bar coating or a spray coating. The electrochromic layer 300 may be patterned in a certain shape.

On the first electrode 201, an organic layer 500 may be formed. Particularly, the organic layer 500 may be formed as a hole injection layer including a hole injection material, a hole transport layer including a hole transport material, or a laminated structure thereof. In addition, the organic layer 500 may be formed as a single layer structure including a mixture of a hole injection material and a hole transport material. According to an embodiment, the organic layer 500 may be formed using a vacuum deposition or a solution-based deposition method. For example, the organic layer 500 may be deposited by a deposition method in vacuum including a vacuum deposition polymerization method, a sputtering method, a vacuum deposition method, a vacuum thermal deposition method and an electron beam deposition method. For example, the organic layer 500 may be deposited by the solution-based deposition method including a spin coating, a bar coating and a spray coating. The organic layer 500 may be patterned in a certain shape.

A first contact 710 making an electrical connection with the driving part 600 may be formed. According to an embodiment, the first contact 710 may be formed by forming a first contact hole 701 penetrating the organic layer 500, the electrochromic layer 300 and the first electrode 20 and exposing the driving part 600, and then filling the first contact hole 701 with a conductive material. The first contact 710 may be insulated from the organic layer 500, the electrochromic layer 300 and the first electrode 201. For example, the first contact 710 may be spaced apart from the outer wall of the first contact hole 701. For example, an insulating material may be disposed between the first contact 710 and the outer wall of the first contact hole 701.

A common electrode 203 may be formed on the electrochromic layer 300. According to an embodiment, the common electrode 203 may be formed by forming a transparent conductive layer on the electrochromic layer 300 and patterning thereof. For example, the transparent conductive layer may be deposited by a sputtering method.

On the common electrode 203, an emission part 400 may be formed. The emission part 400 may include a hole injection layer, a hole transport layer, an emission layer, an electron transport layer and/or an electron injection layer. The emission part 400 may be formed using a vacuum deposition or a solution-based deposition method.

A second contact 720 making an electrical connection with the driving part 600 may be formed. In an embodiment, the second contact 720 may be formed by forming a second contact hole 702 penetrating the emission part 400, the common electrode 203, the organic layer 500, the electrochromic layer 300 and the first electrode 201 and exposing the driving part 600, and then filling the second contact hole 702 with a conductive material. The second contact 720 may be insulated from the emission part 400, the common electrode 203, the organic layer 500, the electrochromic layer 300 and the first electrode 201. For example, the second contact 720 may be spaced apart from the outer wall of the second contact hole 702. For example, an insulating material may be disposed between the second contact 720 and the outer wall of the second contact hole 702.

On the emission part 400, a second electrode 202 may be formed. In an embodiment, the second electrode 202 may be formed by forming a transparent conductive layer on the emission part 400 and then patterning thereof. For example, the transparent conductive layer may be deposited by a sputtering method.

A second substrate 102 may be formed on the second electrode 202. For example, the second substrate 102 may be encapsulated. In the case where the second substrate 102 is encapsulated, the second electrode 202 may play the role of a passivation layer.

For the complex display device 10b of FIG. 2, the same method for manufacturing the complex display device 10a may be applied except for changing the formation order of the electrochromic layer 300 and the organic layer 500. That is, in the complex display device 10b of FIG. 2, an organic layer 500 may be formed on the first electrode 201, and then, an electrochromic layer 300 may be formed on the organic layer 500.

Figure 3:
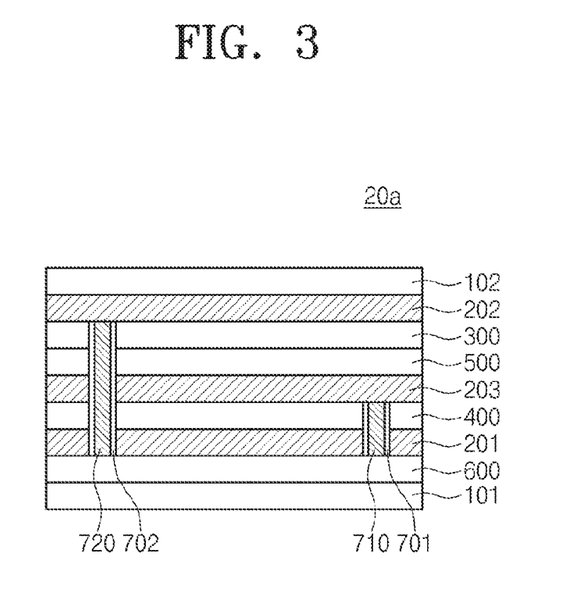
FIGS. 3 and 4 are cross-sectional views of complex display devices according to a second embodiment of the inventive concept.
Figure 4:
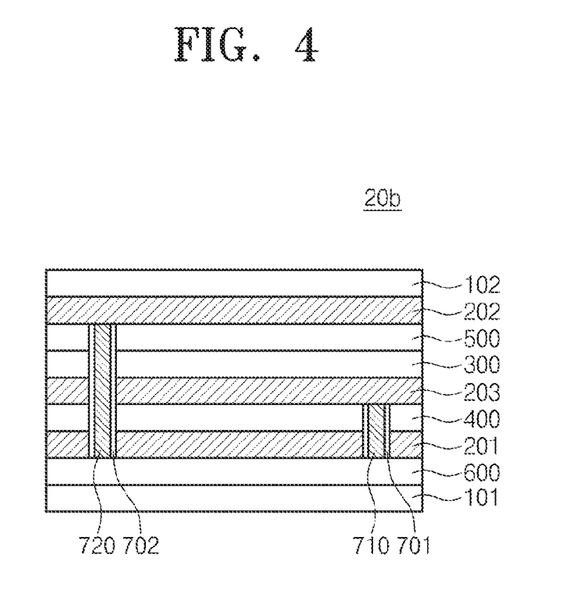

FIGS. 3 and 4 are cross-sectional views of complex display devices according to a second embodiment of the inventive concept. The components and the manufacturing method of the complex display devices according to the second embodiment may be the same as those of the first embodiment except for the position disposed of the electrochromic layer and the emission layer. For simplicity, explanation will be given mainly with the disposed structure of an electrochromic layer, an emission part and an organic layer.

Referring to FIGS. 3 and 4, complex display devices 20a and 20b according to a second embodiment of the inventive concept may include a first substrate 101, an opposing second substrate 102, a plurality of electrodes provided between the first and second substrates 101 and 102, an electrochromic layer 300, an emission part 400, an organic layer 500 and a driving part 600. The plurality of electrodes may include a first electrode 201, a second electrode 202 and a common electrode 203. The complex display device 20a and the complex display device 20b are substantially the same except for the position of the organic layer 500. This will be explained in detail below.

The electrochromic layer 300 may be disposed between the second electrode 202 and the common electrode 203. When a voltage is applied between the second electrode 202 and the common electrode 203, an oxidation or a reduction reaction may occur in the electrochromic layer 300. Due to the oxidation or the reduction reaction, the optical characteristic of the electrochromic layer 300 may be reversibly changed. Images produced by the electrochromic layer 300 may be displayed via the second substrate 102. That is, the electrochromic layer 300 may achieve the reflection mode of the complex display devices 20a and 20b.

According to an embodiment, as shown in FIG. 3, the organic layer 500 may be disposed between the electrochromic layer 300 and the common electrode 203. In this embodiment, a material for forming the organic layer 500 may be selected according to the polarity of the common electrode 203. Particularly, in the case where the common electrode 203 is an anode, the organic layer 500 may include at least one of a hole injection material, a hole transport material or a mixture thereof. For example, the organic layer 500 may have a structure of a hole injection layer including a hole injection material, a hole transport layer including a hole transport material, or a laminated structure thereof. Alternatively, the organic layer 500 may have a single layer structure including a mixture of the hole injection material and the hole transport material. Differently, in the case where the common electrode 203 is a cathode, the organic layer 500 may include at least one of an electron injection material, an electron transport material or a mixture thereof. In an embodiment, the organic layer 500 may have a structure of an electron injection layer including an electron injection material, an electron transport layer including an electron transport material, or a laminated structure thereof. Alternatively, the organic layer 500 may have a single layer structure including a mixture of the electron injection material and the electron transport material.

According to another embodiment, as shown in FIG. 4, the organic layer 500 may be disposed between the second electrode 202 and the electrochromic layer 300. In this embodiment, a material forming the organic layer 500 may be selected according to the polarity of the second electrode 202. In the case where the second electrode 202 is a cathode, the organic layer 500 may include at least one of an electron injection material, an electron transport material or a mixture thereof. For example, the organic layer 500 may have a structure of an electron injection layer including an electron injection material, an electron transport layer including an electron transport material, or a laminated structure thereof. Alternatively, the organic layer 500 may have a single layer structure including a mixture of the electron injection material and the electron transport material. Differently, in the case where the second electrode 202 is an anode, the organic layer 500 may include at least one of a hole injection material, a hole transport material or a mixture thereof. In an embodiment, the organic layer 500 may have a structure of a hole injection layer including a hole injection material, a hole transport layer including a hole transport material, or a laminated structure thereof. Alternatively, the organic layer 500 may have a single layer structure including a mixture of the hole injection material and the hole transport material.

The emission part 400 may be disposed between the common electrode 203 and the first electrode 201. When a voltage is applied between the common electrode 203 and the first electrode 201, the emission part 400 may be self-luminescent. Images produced by the emission part 400 may be displayed via the second substrate 102. That is, the emission part 400 may achieve the self-luminescence mode of the complex display devices 20a and 20b.

The driving part 600 may be disposed between the first substrate 101 and the first electrode 201. The driving part 600 may include a plurality of thin film transistors (not shown). The driving part 600 may make an electrical connection with the first electrode 201. Further, the driving part 600 may make electrical connection with the common electrode 203 and the second electrode 202, respectively via a first contact 710 and a second contact 720. In this embodiment, the first contact 710 may make an electrical connection with the driving part 600 and the common electrode 203 via the emission part 400 and the first electrode 201, and the second contact 720 may make electrical connection with the driving part 600 and the second electrode 202 via the electrochromic layer 300, the organic layer 500, the common electrode 203, the emission part 400 and the first electrode 201. The first contact 710 may be formed in a first contact hole 701 penetrating the emission part 400 and the first electrode 201 and exposing the driving part 600. The first contact may be insulated from the emission part 400 and the first electrode 201. For example, the first contact 710 may be spaced apart from the outer wall of the first contact hole 701. For example, an insulating material may be disposed between the first contact 710 and the outer wall of the first contact hole 701. The second contact 720 may be formed in a second contact hole 702 penetrating the electrochromic layer 300, the organic layer 500, the common electrode 203, the emission part 400 and the first electrode 201 and exposing the driving part 600. The second contact 720 may be insulated from the electrochromic layer 300, the organic layer 500, the common electrode 203, the emission part 400 and the first electrode 201. For example, the second contact 720 may be spaced apart from the outer wall of the second contact hole 702. For example, an insulating material may be disposed between the second contact 720 and the outer wall of the second contact hole 702.

Figure 5:
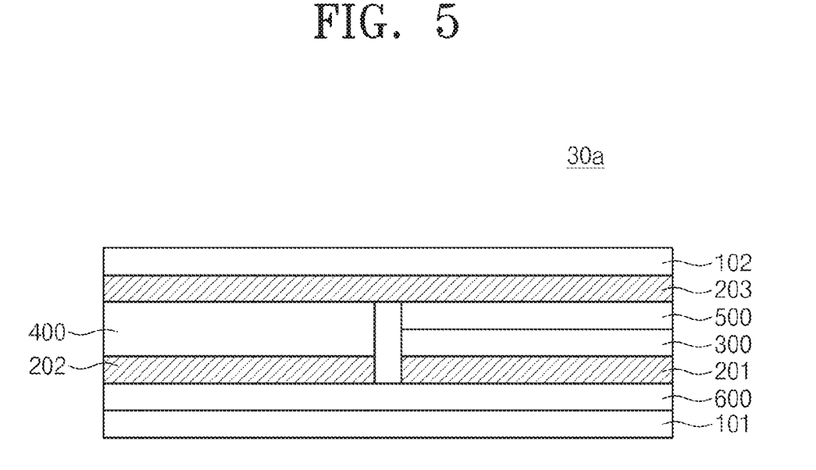
FIGS. 5 and 6 are cross-sectional views of complex display devices according to a third embodiment of the inventive concept.
Figure 6:
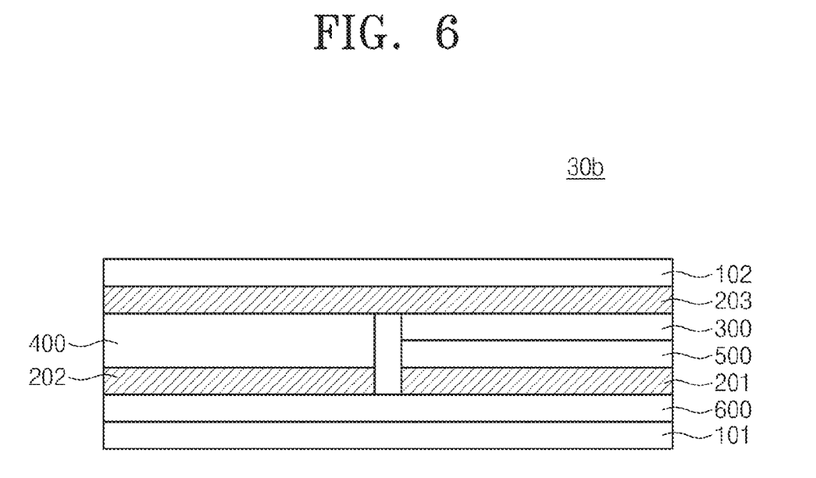

FIGS. 5 and 6 are cross-sectional views of complex display devices according to a third embodiment of the inventive concept. The components of the complex display device according to the third embodiment may be the same as those of the first embodiment. For simplicity, explanation will be given mainly with the disposed structure of the elements.

Referring to FIGS. 5 and 6, complex display devices 30*a* and 30*b* according to a third embodiment of the inventive concept may include a first substrate 101, an opposing second substrate 102, a plurality of electrodes provided between the first and second substrates 101 and 102, an electrochromic layer 300, an emission part 400, an organic layer 500 and a driving part 600. The plurality of electrodes may include a first electrode 201, a second electrode 202 and a common electrode 203. The complex display device 30*a* and the complex display device 30*b* may be substantially the same except for the position disposed of the organic layer 500.

The first electrode 201 and the second electrode 202 may be disposed on the first substrate 101. The first electrode 201 and the second electrode 202 may be separated in parallel to each other on the first substrate 101. That is, the first electrode 201 and the second electrode 202 may be electrically insulated from each other. The common electrode 203 may be disposed on one side of the second substrate 102 opposed to the first substrate 101. In an embodiment, the first electrode 201 and the second electrode 202 may be cathodes respectively applying negative voltages to the electrochromic layer 300 and the emission part 400. In this case, the common electrode 203 may be a common anode applying a positive voltage to the first electrode 201 and the second electrode 202. According to another embodiment, the first electrode 201 and the second electrode 202 may be anodes, respectively applying a positive voltage to the electrochromic layer 300 and the emission part 400. In this case, the common electrode 203 may be a common cathode applying a negative voltage to the first electrode 201 and the second electrode 202.

The electrochromic layer 300 may be disposed between the first electrode 201 and the common electrode 203. The electrochromic layer 300 may have a thickness from about 2 to about 1,000 nm. When a voltage is applied between the first electrode 201 and the second electrode 203, an oxidation or a reduction reaction may occur in the electrochromic layer 300. Due to the oxidation or the reduction reaction, the optical characteristic of the electrochromic layer 300 may be reversibly changed. Images produced by the electrochromic layer 300 may be displayed via the second substrate 102. That is, the electrochromic layer 300 may achieve the reflection mode of the complex display devices 30*a* and 30*b*. The complex display devices 30*a* and 30*b* may effectively exhibit reflection mode images in a bright place.

According to an embodiment, as shown in FIG. 5, the organic layer 500 may be disposed between the electrochromic layer 300 and the common electrode 203. The organic layer 500 may have a thickness from about 2 to about 1,000 nm. In this embodiment, a material forming the organic layer 500 may be selected according to the polarity of the common electrode 203. Particularly, in the case where the common electrode 203 is an anode, the organic layer 500 may include at least one of a hole injection material, a hole transport material or a mixture thereof. For example, the organic layer 500 may have a structure of a hole injection layer including a hole injection material, a hole transport layer including a hole transport material, or a laminated structure thereof. Alternatively, the organic layer 500 may have a single layer structure including a mixture of the hole injection material and the hole transport material. Differently, in the case where the common electrode 203 is a cathode, the organic layer 500 may include at least one of an electron injection material, an electron transport material or a mixture thereof. In an embodiment, the organic layer 500 may have a structure of an electron injection layer including an electron injection material, an electron transport layer including an electron transport material, or a laminated structure thereof. Alternatively, the organic layer 500 may have a single layer structure including a mixture of the electron injection material and the electron transport material.

According to another embodiment, as shown in FIG. 6, the organic layer 500 may be disposed between the first electrode 201 and the electrochromic layer 300. In this embodiment, a material for forming the organic layer 500 may be selected according to the polarity of the first electrode 201. In the case where the first electrode 201 is a cathode, the organic layer 500 may include at least one of an electron injection material, an electron transport material or a mixture thereof. For example, the organic layer 500 may have a structure of an electron injection layer including an electron injection material, an electron transport layer including an electron transport material, or a laminated structure thereof. Alternatively, the organic layer 500 may have a single layer structure including a mixture of the electron injection material and the electron transport material. Differently, in the case where the first electrode 201 is an anode, the organic layer 500 may include at least one of a hole injection material, a hole transport material or a mixture thereof. In an embodiment, the organic layer 500 may have a structure of a hole injection layer including a hole injection material, a hole transport layer including a hole transport material, or a laminated structure thereof. Alternatively, the organic layer 500 may have a single layer structure including a mixture of the hole injection material and the hole transport material.

The emission part 400 may be disposed between the common electrode 203 and the second electrode 202. When a voltage is applied between the common electrode 203 and the second electrode 202, the emission part 400 may be self-luminescent. Images produced by the emission part 400 may be displayed via the second substrate 102. That is, the emission part 400 may achieve the self-luminescent mode of the complex display devices 30*a* and 30*b*. The complex display devices 30*a* and 30*b* may effectively exhibit self-luminescent mode images in a dark indoor room.

The emission part 400, the common electrode 203 and the second electrode 202 may be driven as an OLED. For example, the emission part 400 may include a hole injection layer, a hole transport layer, an emission layer, an electron transport layer and an electron injection layer. In the case where the common electrode 203 is a cathode and the second electrode 202 is an anode, the emission part 400 may include an electron injection layer, an electron transport layer, an emission layer, a hole transport layer and a hole injection layer laminated one by one on the common electrode 203. In the case where the common electrode 203 is an anode, and the second electrode 202 is a cathode, the emission part 400 may include a hole injection layer, a hole transport layer, an emission layer, an electron transport layer and an electron injection layer laminated one by one on the common electrode 203.

The driving part 600 may be disposed between the first substrate 101 and the first electrode 201. The driving part 600 may include a plurality of thin film transistors (not shown). The driving part 600 may control the achievement of the reflection mode and the self-luminescence mode of the complex display devices 30a and 30b. For example, the driving part 600 may achieve the self-luminescence mode by applying a voltage between the common electrode 203 and the second electrode 202. For example, the driving part 600 may achieve the reflection mode by applying a voltage between the first electrode 201 and the common electrode 203. By selectively driving the reflection mode and the self-luminescence mode by the driving part 600, the complex display devices 30a and 30b may achieve a dual mode to suit its environment. As a result, the power consumption of the complex display devices 30a and 30b may be minimized, and the visibility thereof may be improved.

The complex display device 30a according to the third embodiment may be manufactured as follows.

On a first substrate 101, a driving part 600, a first electrode 201, a second electrode 202, an electrochromic layer 300, an emission part 400 and an organic layer 500 may be formed. The method of manufacturing each of the driving part 600, the first electrode 201, the second electrode 202, the electrochromic layer 300, the emission part 400 and the organic layer 500 may be substantially the same as those explained in the first embodiment.

A common electrode 203 may be formed on a second substrate 102. The method of manufacturing the common electrode 203 may be substantially the same as that explained in the first embodiment.

Then, the first substrate 101 and the second substrate 102 may be joined. In an embodiment, the first substrate 101 and the second substrate 102 may be joined through a pressurizing process. For example, the first substrate 101 and the second substrate 102 may be joined using a roll-laminator.

According to exemplary embodiments of the present disclosure, an organic layer other than an electrolyte layer (or an ion conducting layer) may be used as a charge medium layer for an electrochromic layer. Accordingly, partitions or an encapsulating process for storing an electrolyte is/are not necessary, and the deterioration of stability due to the volatilization of solvents is not generated. Therefore, a complex display device which has good structural stability and visibility, and of which manufacturing process is simplified may be provided. Further, since the complex display device according to an embodiment uses only one driving part, power consumption may decrease, thereby improving power efficiency.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A complex display device, comprising:
   a first substrate and an opposed second substrate;
   a first electrode, an electrochromic layer, a common electrode, an emission part and a second electrode, laminated between the first substrate and the second substrate one by one; and
   an organic layer disposed between the first electrode and the electrochromic layer, or between the electrochromic layer and the common electrode.

2. The complex display device of claim 1, wherein the organic layer comprises at least one of a hole injection material, a hole transport material, or a mixture thereof, or at least one of an electron injection material, an electron transport material, or a mixture thereof.

3. The complex display device of claim 2, wherein the organic layer comprises an electron injection material and the electron injection material comprises PEIE or ZnO.

4. The complex display device of claim 2, wherein the organic layer comprises an electron transport material and the electron transport material comprises Alq$_3$, TPBi, BBOT, PBD, BMD, Ir(piq)$_3$, Ir(piq)$_2$(acac), or rubrene.

5. The complex display device of claim 2, wherein the organic layer comprises a hole injection material and the hole injection material comprises PEDOT:PSS, PVK, TFB, α-NPD, or TPD.

6. The complex display device of claim 2, wherein the organic layer comprises a hole transport material and the hole transport material comprises 2-TNATA, m-MTDATA, Ir(piq)$_3$, Ir(piq)$_2$(acac), or rubrene.

7. The complex display device of claim 1, further comprising a driving part disposed between the first substrate and the first electrode, or between the second electrode and the second substrate.

8. The complex display device of claim 7, wherein the driving part is disposed between the first substrate and the first electrode, and
   images produced at the electrochromic layer or the emission part are displayed via the second substrate.

9. The complex display device of claim 8, further comprising:
   a first contact electrically connecting the common electrode and the driving part; and
   a second contact electrically connecting the second electrode and the driving part.

10. The complex display device of claim 7, wherein the driving part is disposed between the second substrate and the second electrode, and
    images produced at the electrochromic layer or the emission part are displayed via the first substrate.

11. The complex display device of claim 10, further comprising:
    a first contact electrically connecting the common electrode and the driving part; and
    a second contact electrically connecting the first electrode and the driving part.

12. The complex display device of claim 1, wherein the emission part comprises an organic emission layer.

13. A complex display device, comprising:
    a first substrate;
    a first electrode and a second electrode separately disposed in parallel to each other above the first substrate;
    an electrochromic layer on the first electrode;
    an emission part on the second electrode;
    a common electrode disposed on the emission part, the common electrode being extended on the electrochromic layer;

a second substrate on the common electrode; and an organic layer disposed between the first electrode and the electrochromic layer, or between the electrochromic layer and the common electrode.

14. The complex display device of claim 13, wherein the organic layer comprises at least one of a hole injection material, a hole transport material, or a mixture thereof, or at least one of an electron injection material, an electron transport material, or a mixture thereof.

15. The complex display device of claim 14, wherein the organic layer comprises an electron injection material and the electron injection material comprises PEIE or ZnO.

16. The complex display device of claim 14, wherein the organic layer comprises an electron transport material and the electron transport material comprises $Alq_3$, TPBi, BBOT, PBD, BMD, $Ir(piq)_3$, $Ir(piq)_2(acac)$, or rubrene.

17. The complex display device of claim 14, wherein the organic layer comprises a hole injection material and the hole injection material comprises PEDOT:PSS, PVK, TFB, α-NPD, or TPD.

18. The complex display device of claim 14, wherein the organic layer comprises a hole transport material and the hole transport material comprises 2-TNATA, m-MTDATA, $Ir(piq)_3$, $Ir(piq)_2(acac)$, or rubrene.

19. The complex display device of claim 13, further comprising a driving part disposed between the first substrate and the first electrode.

20. The complex display device of claim 13, wherein the emission part comprises an organic emission layer.

* * * * *